United States Patent [19]
Liebsch et al.

[11] 3,897,314
[45] July 29, 1975

[54] PROCESS FOR REMOVING DISTILLATION RESIDUE FROM CRUDE ISOCYANATES

[75] Inventors: Dietrich Liebsch, Leverkusen; Dieter Becher, Leichlingen; Rudolf Kress, Cologne; Heinz Sauer, Odenthal-Hahnenberg, all of Germany

[73] Assignee: Bayer Aktiengesellschaft, Germany

[22] Filed: Feb. 7, 1974

[21] Appl. No.: 440,425

Related U.S. Application Data
[63] Continuation of Ser. No. 161,817, July 12, 1971, abandoned.

[30] Foreign Application Priority Data
July 18, 1970 Germany.......................... 2035731

[52] U.S. Cl. .................. 203/89; 203/72; 203/97; 260/453 SP; 260/453 PH
[51] Int. Cl. ............................................ B01d 3/00
[58] Field of Search ...................... 203/72, 97, 89; 260/453 SP, 453 PH

[56] References Cited
UNITED STATES PATENTS

| | | | |
|---|---|---|---|
| 3,214,349 | 10/1965 | Kehoe et al. .......................... | 203/11 |
| 3,470,070 | 9/1969 | Heckart ................................ | 203/88 |
| 3,471,543 | 10/1969 | Sayigh.................................. | 203/89 |
| 3,554,872 | 1/1971 | Chang et al........................... | 203/89 |
| 3,565,768 | 2/1971 | Grant et al............................ | 203/89 |
| 3,616,611 | 11/1971 | Gentili ................................... | 55/165 |
| 3,644,179 | 2/1972 | Knoer et al. .......................... | 203/89 |

OTHER PUBLICATIONS
Bailor, Jr., Def. Pub. of Serial No. 872,587 filed Oct. 30, 1969, Published in June 16, 1970, Def. Pub. T875,017.

Primary Examiner—Norman Yudkoff
Assistant Examiner—F. Sever
Attorney, Agent, or Firm—Joseph C. Gil

[57] ABSTRACT

A process is provided for separating residue from isocyanate concentrates produced by the phosgenation of organic amines. The isocyanate concentrate is passed under high vacuum through a system of downpipe evaporators and cyclone separators a portion of the liquid residue from the separator being recycled to the inlet of the evaporator along with the concentrate feed.

2 Claims, 1 Drawing Figure

PATENTED JUL 29 1975
3,897,314
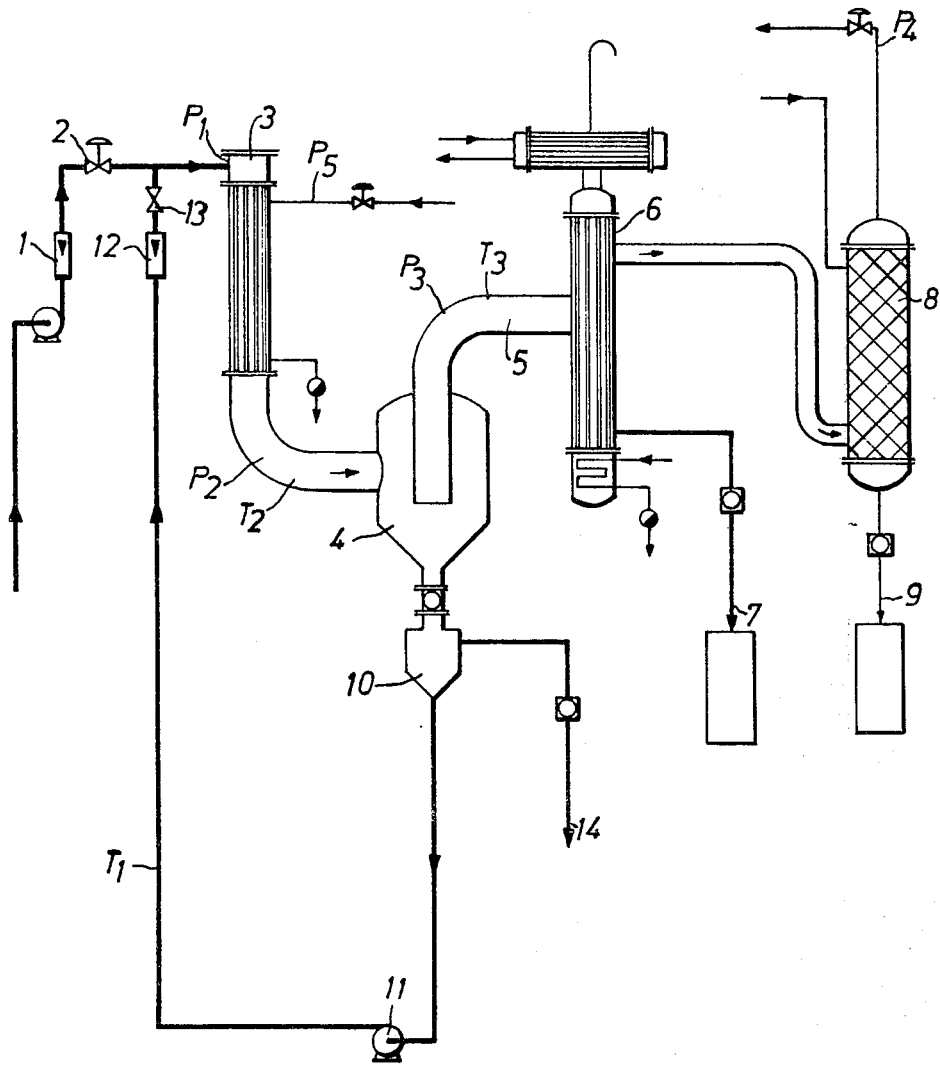
INVENTORS:
DIETRICH LIEBSCH, DIETER BECHER, RUDOLF KRESS, HEINZ SAUER.
BY Robert A. Gerlach

PROCESS FOR REMOVING DISTILLATION RESIDUE FROM CRUDE ISOCYANATES

This is a continuation, of application Ser. No. 161,817, filed July 2, 1971 now abandoned.

When crude isocyanate solutions which have been obtained by reacting amines with phosgene are worked up by distillation higher molecular weight residues which cannot be distilled remain behind and must be separated from the pure isocyanate, the solvent used and any volatile by-products present. The residue is mainly due to the following factors:

1. Accumulation of comparatively non-volatile secondary products of the impurities present in the starting materials.
2. Conversion of the isocyanate originally formed into higher molecular weight secondary products under the reaction conditions or under the conditions under which the product is worked up by distillation. For example, isocyanurate and carbodiimide derivatives may be formed from isocyanates at high temperatures.
3. Monomeric isocyanate which cannot be distilled adheres to the original residue. This isocyanate may change into isocyanate derivatives on cooling of the residue (e.g. addition reaction with carbodiimides).

On a technical scale, removal of the residue is nowadays mainly carried out by an intermittent process from the crude solution or the concentrate which is substantially free from solvent, using so-called residue pans. The viscous mixture remaining behind after removal of the major portion by distillation is distilled by strong heating in a vacuum with stirring so that it is freed from isocyanates to the extent that the hot residue remaining behind can be discharged in the form of a liquid through a valve at the bottom of the pan.

This process has the following serious disadvantages:

1. The high temperatures to which the pans must be heated over prolonged periods in order to free the residue from distillable isocyanate causes losses in yields due to the reaction of monomeric isocyanate with the preformed residues or with itself.

The residue obtained is a high molecular weight product which varies widely in its composition and is in most cases, so highly viscous that it cannot be transported with pumps even at high temperatures.

2. The time at which distillation in the pan must be stopped is difficult to recognise. If distillation is stopped too soon, isocyanate is lost. If it is stopped later, exothermic polymerisation and carbodiimidisation reactions are liable to take place. The residue solidifies in the pan and can no longer be discharged.
3. Discharge of the hot residue involves pollution of the surroundings with hot isocyanate vapours even if efficient exhaust systems are provided.

A satisfactory process for removing distillable isocyanates from non-distillable residues must meet the following requirements.

1. Separation should be carried out at a low temperature.

The residue obtained should contain as little monomeric isocyanate as possible, should be highly fluid when hot and should be dischargeable at atmospheric pressure.

2. Monomeric isocyanate should only be heated for a very short time to high temperatures in the presence of the residue already formed.
3. The process should be continuous.

The following processes for the continuous separation of residues from crude isocyanate concentrates are already known:

1. According to U.S. Pat. No. 3,140,305 of Food Machinery Corp. and U.S. Pat. No. 3,410,888 of Upjohn Comp. most of the isocyanate present in isocyanate concentrates is removed by distillation by means of known systems such as continuous flow heaters which have pressure releasing vessels attached, and thin layer evaporators are used for the subsequent careful removal of residue. The residue is fluid and may in some cases (U.S. Pat. No. 3,140,305) be continuously discharged from the vacuum at atmospheric pressure without pumps. In practice, this method of removing residue is liable to give trouble, and moreover encrustations are formed on the walls of the thin layer evaporator within a relatively short time.
2. Continuous removal of residue can be achieved by means of suitable additives added to the isocyanate concentrates. The published Dutch Patent Applications 6,708,349 and 6,613,340 and British Patent Specification No. 1,083,910, for example, describe the continuous removal of residue in thin layer evaporators after the addition of 3 to 10% of polyarylmethanepolyisocyanates or small quantities of monofunctional polyether alcohols to the isocyanate concentrates.

It has now been found that the continuous removal of residues from isocyanate concentrates can be achieved by a single step process without additives or the use of thin layer evaporators as follows:

1. Crude isocyanate concentrate is fed continuously into a descending evaporator pipe, the construction of which will be described hereinafter, and the concentrate is heated to the temperature required to achieve substantial evaporation of the monomeric isocyanate when it is subsequently released into a vacuum.
2. The isocyanate evaporated in an evaporation vessel attached to the aforesaid evaporator pipe is condensed by some suitable method. The hot, highly fluid residue discharged from the evaporation vessel is returned to the inlet of the descending evaporator pipe where it is mixed with fresh isocyanate concentrate.
3. Part of the residue is continuously removed from the cycle at atmospheric pressure.

The fluid residue carried in the cycle contains between 1 and 50% of monomeric isocyanate, depending on the crude isocyanate used. In a preferred embodiment of the process, the quantity of residue pumped through the cycle is a multiple of the quantity of concentrate fed into the system. One important advantage of the new process is that circulating the residue enables the time of stay of the monomeric isocyanate in the descending evaporator pipe to be controlled and hence optimised. The high rate of flow of the liquid in the descending pipes ensures uniform wetting of the hot surfaces, prevents encrustation of the walls and prevents localised overheating. Since transfer of heat is very efficient in a rapidly flowing liquid, overheating on the walls of the evaporator can be reduced to a minimum. The circulating residue helps to transfer the heat of evaporation to the monomeric isocyanate. It remains highly fluid and can be discharged into closed containers at atmospheric pressure or it can be scraped off in a solid form by means of cooled scraper rollers or cooling strips. Noxious odours due to the isocyanate vapours are no longer a problem. In the case of most isocyanates, this careful method of working up enables an increased yield to be obtained.

The present invention therefore relates to a process for the single stage continuous removal of residues from isocyanate concentrates of the type obtained when working up by distillation the crude isocyanate solutions obtained by reacting amines with phosgene, which process is characterised in that the volatile isocyanate contained in the concentrates is evaporated under vacuum in a system of downpipe evaporators and vacuum vessels, the highly fluid residue discharged from the vacuum vessel is returned to the inlet of the downpipe evaporator, and a portion of the residue is continuously removed from the cycle thus formed.

The downpipes advantageously have a diameter of 25 to 60 mm and preferably 40 to 50 mm and a length of up to 3.5 m and are arranged vertically and surrounded by a steam jacket which is preferably common to all the pipes and which can be heated with steam of different temperatures according to the isocyanate. The isocyanate concentrate is fed into the top of the downpipe evaporator together with the circulating residue. The mixture of liquid and vapour leaving the downpipe evaporator is released into a cyclone separator in which it is separated. A very high vacuum, depending on the boiling point of the monomeric isocyanate, is applied to the separator via a scrubber and condenser connected to the separator. The process is preferably carried out at pressures of less than 10 mm Hg in the vapour tube between the cycle separator and the condenser. The evaporated isocyanate leaves the cyclone separator through the vapour tube and is condensed in the condenser. The low boiling impurities reach the scrubber, for example a short packed column which is sprayed with the solvent used for phosgenation. The thin fluid residue discharged from the vacuum vessel is returned to the inlet of the downpipe by means of a rotary pump. The cyclone separator and all the conduits carrying isocyanate and residue are insulated and heated with steam at a pressure of 5 to 6 excess atmospheres. Part of the residue is removed from the cycle via an overflow at atmospheric pressure or via pumps to the receiver for residue or to the scraper roller or cooling band.

In the drawing which illustrates the invention, the reference numerals have the following meanings:

1 Flow meter (inflow of product)
2 Control valve
3 Downpipe evaporator
4 Cyclone separator
5 Vapour tube
6 Condenser
7 Tank for crude distillate or scraper roller
8 Scrubber
9 Tank for crude product
10 Buffer vessel
11 Rotary pump
12 Flow meter (return flow to downpipe evaporator)
13 Valve
14 Receiver for residue, scraper roller or cooling band.

The pressures and temperatures employed in the process according to the invention depend primarily on the nature of the isocyanate concentrates which are to be worked up.

Generally, the following values are employed:

| | |
|---|---|
| $P_1$ (pressure at inlet to downpipe evaporator) | 10 to 760 mm Hg. |
| $P_2$ (pressure at outflow from downpipe evaporator) | 0.05 to 50 " |
| $P_3$ (pressure of vapour tube cyclone separator) | 0.05 to 50 " |
| $P_4$ (pressure behind scrubber) | 0.05 to 50 " |
| $P_5$ (pressure of steam to downpipe evaporator) | 0.5 to 45 excess atmospheres |
| $T_1$ (temperature in the cycle) | 50 to 250°C |
| $T_2$ (temperature at exit of downpipe evaporator) | 80 to 250°C |
| $T_3$ (temperature of vapour tube cyclone separator) | 80 to 250°C |

These values naturally only indicate the preferred operating conditions and in no way restrict the process according to the invention. The process according to the invention may be applied to numerous aliphatic, cycloaliphatic, aromatic and mixed aliphatic-aromatic mono and polyisocyanates.

The liquid residue recycled is generally from about 2 to about 100, in most cases from about 10 to about 80 times the quantity of isocyanate concentrate feed.

Suitable materials are, for example, residue-containing concentrates of hexamethylene diisocyanate, trimethylhexamethylene diisocyanate, 1-isocyanato-3,3,5-trimethyl-5-isocyanatomethyl-cyclohexane, naphthylene-1,5-diisocyanate, toluylene-2,4- and -2,6-diisocyanate and mixtures of these, 2,4'- and 4,4'-diisocyanatodiphenylmethane and mixtures of these, cyclohexylisocyanate, stearyl isocyanate, phenyl isocyanate, o-, m- and p-tolylisocyanate, o-, m- and p-chlorophenylisocyanate, 3,4-dichlorophenyl isocyanate, 2,6-diisopropylphenylisocyanate, 2,6-triisocyanato-1,3,5-triisopropylbenzene, etc.

The following Examples serve to illustrate the process of the invention without restricting it.

EXAMPLE 1

In the apparatus shown in the drawing, a concentrate of hexamethylene-1,6-diisocyanate which contains residue is fed into the downpipe evaporator 3 at the rate of 250 kg per hour from a tank of concentrate by means of an immersion pump via a flow meter 1 and control valve 2. The downpipe evaporator 3 consists of 40 pipes 1.5 m in length and 42 mm in diameter which are surrounded by a common heating jacket with steam at 17 excess atmospheres. The mixture of vapour and residue leaving the evaporator is released into a cyclone separator 4 of the usual construction which has a capacity of about 330 litres and which is heated with steam at 5 excess atmospheres. From the volatile constituents distilled under vacuum through the vapour tube 5, about 240 litres per hour of crude distillate are condensed in an evaporation condenser 6 of conventional construction (6.5 m² evaporator surface, filled with water). This crude distillate has the following composition (gas chromatography):

| | vol. % |
|---|---|
| o-Dichlorobenzene | 1.5 |
| 1,6-dichlorohexane | 0.15 |

-Continued

| | |
|---|---|
| chlorohexylisocyanate | 1.6 |
| hexamethylene-1,6-diisocyanate | 96.8. |

The crude distillate flows under atmospheric pressure into the receiver tank for crude distillate 7.

The low boiling constituents partly reach the scrubber 8 which consists of a packing column 40 cm in diameter and 1.5 m in length which is filled with VA Interpack filling bodies measuring 25 mm and which is charged with o-dichlorobenzene at the rate of 100 kg per hour. The discharge from the scrubber is returned to the crude isocyanate solution which results from the phosgenation of hexamethylene-1,6-diamine in o-dichlorobenzene under the usual conditions which is collected in the tank 9. The thin liquid residue discharged from the cyclone separator 4 is returned to the downpipe evaporator by means of a rotary pump 11 via a buffer vessel 10 which is heated with steam at 5 excess atmospheres and heated conduits. The amount circulated is adjusted to 5 $m^3$ per hour by means of the flow meter 12 and valve 13. The operating conditions of the apparatus shown in the attached drawing 1 are summarised in Table 1.

Table 1

| | | |
|---|---|---|
| Pressure at inlet of downpipe evaporator | ($P_1$) | "mm Hg |
| Pressure at outlet of downpipe evaporator | ($P_2$) 7.5 | " |
| Pressure in vapour tube cyclone evaporator | ($P_3$) 7.0 | " |
| Pressure behind scrubber | ($P_4$) 7.0 | " |
| Temperature in the cycle | ($T_1$) 189°C | |
| Temperature and outlet of downpipe evaporator | ($T_2$) 197°C | |
| Temperature in vapour tube cyclone separator | ($T_3$) 180°C | |
| Steam for the downpipe evaporator | ($P_5$) 17 ex.atm. | |

Under these conditions, 10 kg per hour are discharged from the buffer vessel 10 to the residue receiver 14. The yield of crude distillate is therefore 96% of the theory. A further 3.8% of the starting material can be distilled from a sample of residue in the laboratory at 2 to 3 mm Hg at temperatures of up to 220°C. The distillate has the following composition:

| | Vol. % |
|---|---|
| Unknown compound | 0.43 |
| o-dichlorobenzene | 0.49 |
| 1,6-dichlorohexane | 0.49 |
| chlorohexylisocyanate | 3.4 |
| hexamethylene-1,6-diixocyanate | 95.5 |

The residue discharged remains liquid for some time even at normal temperature if air is excluded, and it is discharged to settling tanks for combustion.

EXAMPLE 2

86 kg per hour of naphthylene-1,5-diisocyanate concentrate are fed continuously into a downpipe 3 of 50 mm diameter and 3 m length which is heated with steam at 25 excess atmospheres.

After release into a cyclone separator 4 of conventional design and capacity 250 litres which is under a vacuum, 79 kg/hour of pure naphthylene-1,5-diisocyanate are condensed in the evaporation condenser 6 (4.17 $m^2$ evaporator surface, filled with chlorobenzene) and this condensate is removed with a scraper roller 7 and filled into tanks. Low boiling constituents are scrubbed out of the waste gas in the scrubber 8 as described in Example 1. The thin liquid residue discharged from the cyclone separator 4 is returned to the inlet of the downpipe as in Example 1. When the quantity circulated by the pump was 4 $m^3$/ hour the yield obtained under the conditions shown in Table 1 was 92%. The residue (7 kg/hour) discharged from the buffer vessel 10 to the residue receiver 14 slowly solidifies in the cold to a hard mass which contains 48.2% of naphthylene-1,5-diisocyanate.

Table 2

| | |
|---|---|
| Pressure at inlet of downpipe evaporator | ($P_1$) 19 mm Hg |
| Pressure at outlet of downpipe evaporator | ($P_2$) 7   " |
| Pressure in vapour tube cyclone separator | ($P_3$) 3   " |
| Pressure behind the scrubber | ($P_4$) 2.9 mm Hg |
| Temperature in the cycle | ($T_1$) 170°C |
| Temperature at outlet of downpipe evaporator | ($T_2$) 156°C |
| Temperature in vapour tube of cyclone separator | ($T_3$) 154°C |
| Pressure to the downpipe evaporator | ($P_5$) 25 ex.atm. |

What is claimed is:

1. A process for the single stage continuous separation of residue from isocyanate concentrates obtained by reacting aliphatic, cycloaliphatic, aromatic and mixed aliphatic-aromatic amines with phosgene comprising evaporating the volatile isocyanate from the concentrate in a downpipe evaporator, the pressure at outflow from said downpipe evaporator being between 0.05 to 50 mmHg, the temperature at the exit of the downpipe evaporator being between 80° to 250°C, releasing the mixture of liquid and vapor to a separator in which the same temperature and pressure conditions are maintained, separating the liquid residue from the vapor and continuously returning a portion of the liquid residue to the inlet of the downpipe evaporator while discharging the remainder of the liquid residue from the system, the quantity of the liquid residue which is returned corresponding to about 2 to about 100 times the quantity of isocyanate concentrate feed.

2. The process of claim 1 wherein the downpipe evaporator is comprised of a plurality of vertically arranged downpipes having a diameter of from about 25 to about 60 mm and a length of up to about 3.5 m, said downpipes being surrounded by a common steam jacket.

* * * * *